United States Patent [19]

Ginsberg

[11] Patent Number: 4,912,876
[45] Date of Patent: Apr. 3, 1990

[54] PARTITION WALL PLANTER

[76] Inventor: Alyce Ginsberg, 91 Post La., Bernardsville, N.J. 07924

[21] Appl. No.: 215,565

[22] Filed: Jul. 6, 1988

[51] Int. Cl.⁴ ............................................. A01G 9/02
[52] U.S. Cl. ............................................. 47/66; 47/68
[58] Field of Search ............... 47/33, 39, 66, 68, 86, 47/41.11; 248/213, 213.1, 213.2, 213.3, 213.4, 220.1

[56] References Cited

U.S. PATENT DOCUMENTS

| | | | |
|---|---|---|---|
| 1,095,312 | 5/1914 | Curtiss | 248/213.2 |
| 1,293,785 | 2/1919 | Hurst | 47/68 |
| 1,446,231 | 2/1923 | West | 248/208 |
| 1,558,977 | 10/1925 | Gray | 248/208 |
| 2,019,249 | 10/1935 | Bradley | 47/68 |
| 2,219,975 | 10/1940 | Bentz | 248/220.1 |
| 2,289,451 | 7/1942 | Porcelli | 248/220.1 |
| 2,477,509 | 7/1949 | Burgesser | 47/68 |
| 2,815,910 | 12/1957 | Baker | 248/220.1 |
| 2,828,044 | 3/1958 | Reiss et al. | 248/220.1 |
| 3,978,612 | 9/1976 | Young | 47/40 |
| 4,120,119 | 10/1978 | Engel | 47/66 |
| 4,194,313 | 3/1980 | Downing | 40/620 |
| 4,559,738 | 12/1985 | Helfman | 47/66 |
| 4,640,045 | 2/1987 | Nesbitt et al. | 47/66 |
| 4,698,936 | 10/1987 | Helfman | 47/68 |
| 4,708,310 | 11/1987 | Smith | 248/220.1 |

Primary Examiner—Robert A. Hafer
Assistant Examiner—Charles H. Sam
Attorney, Agent, or Firm—Lerner, David, Littenberg, Krumholz & Mentlik

[57] ABSTRACT

A planter box for mounting on the top of a partial height wall partition having substantially vertical panels connected to a partition wall frame, the planter having a planting chamber defined by a wall connected to a bottom and at least one downwardly depending support flange for orienting and supporting the planter box on the upper horizontal surface of the partial height wall partition. The at least one downwardly depending support flange is concealedly secured between the substantially vertical panels and the partition wall frame and are spaced from the peripheral edge of the bottom so that the front surface of the planter box is substantially contiguous and flush with the front surface of the substantially vertical panels. Two downwardly depending support flanges in orthogonal relationship to one another can be provided for securement behind the two corresponding orthogonally opposed panels on the corner portion of a partial height wall partition.

9 Claims, 5 Drawing Sheets

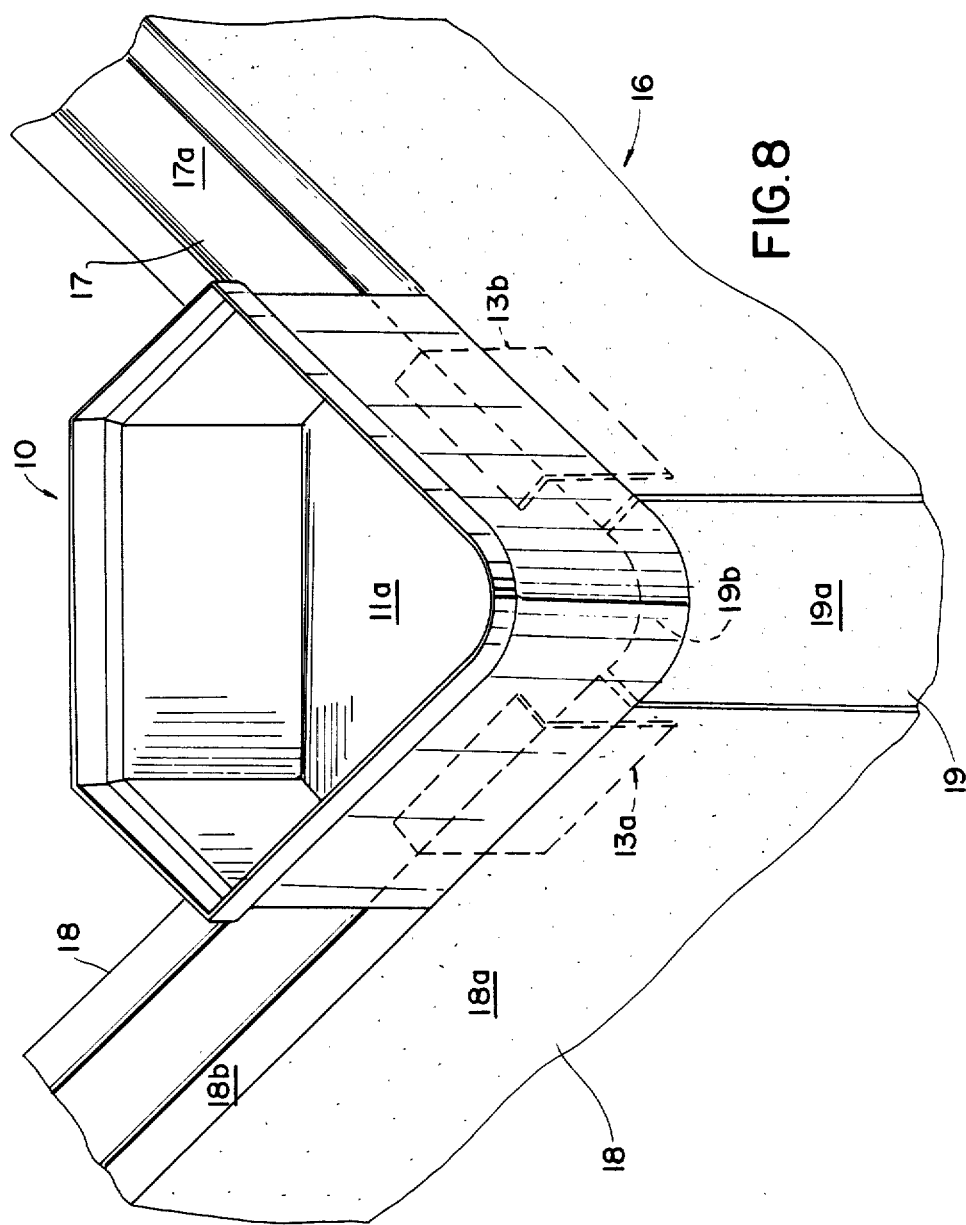

PARTITION WALL PLANTER

BACKGROUND OF THE INVENTION

The present invention relates generally to containers for planting plants, and more particularly to planters for displaying plants on partial height wall partitions.

The floor plan of a modern office space often provides for large open areas having partial height wall partitions to partition individual or shared office space. Such an arrangement provides for the maximum use of an office area while maintaining an open, uncongested feeling for employees. However, such an arrangement includes narrow walkways in the common areas of the office space, thereby minimizing the manner in which the common areas can be decorated. Wall hangings as well as plants and sculptural works which rest on the floor cannot be employed without cluttering the narrow walkways between the partial height wall partitions. Plant holders depending from the ceiling are difficult to hang and care for, and further do not provide a continuous integrated design scheme. It is therefore desirable to utilize the partial height wall partitions to provide the basis for an integrated decorative scheme for such office spaces.

To reduce the space occupied by partial height wall partitions and thereby increase the partitioned office space, these partitions are preferably of a relatively narrow width. Typically, such a partition will be only two to three inches in thickness thereby providing relatively narrow upper horizontal surface on which receptacles or other items might be supported. Many partial height walls or partitions are comprised of supportive frames with decorative panels which are snapped or otherwise fastened to the supportive frame to provide decorative surfaces on either side of the partition. Such partial height partitions are in the order of 3½ inches in thickness wherein the frame thereof is only 1¾ inches in thickness and the decorative panels on either side of the frame are ⅞ inch in thickness. Since the decorative panels on either side of the frame cannot support an appreciable amount of weight, only the narrow upper horizontal surface of the supportive frame can provide support for a planter or other items. It is thus apparent that any item of appreciable weight and/or width will be unstable and dangerous in an office environment unless a bracket system of some type is utilized.

U.S. Pat. Nos. 4,559,738 and 4,698,936, both to Helfman, disclose partial height partition planters. The planters disclosed in the Helfman patents are rectangular in shape and include brackets to support the planter on the top or against the side of a partition wall. In at least one embodiment of the closely related inventions disclosed in the Helfman patents, the support for the planter is accomplished by providing a support bracket having vertical legs which tightly clamp the parallel vertical surfaces of a partial height partition. Other embodiments utilize: sliding tracks which must be fixed to the upper horizontal surface of the partial height partition and mating track means which must be fixed to the bottom of the planter; longitudinal recess means formed in the bottom of the planter to receive the upper portion of a partial height partition; and L-shaped bracket means having a vertical foot portion which is parallel to and spaced from the side portion of the planter so that the upper portion of the partial height partition can be received between the vertical foot portion and vertical side wall of the planter. A similar bracket arrangement is disclosed in U.S. Pat. No. 4,640,045 to Nesbitt, et al. In Nesbitt, et al, a planter box is supported to the top portion of a grave marker by a clamp which saddles the top portion of the grave marker.

While the above discussed patents disclose devices for securing receptacles to the top portion of a partial height partition in an acceptable manner, the support brackets thereof will always be in sight thereby destroying the effect of any decorative covering on the vertical portion of the partial height partition. The Helfman planters also lack the continuous integral appearance which is desirable to incorporate the partial height partition into the decorating scheme. This stems primarily from the lack of means to properly orient the planter in relation to the partition. Thus, the partition remains a partition only rather than also serving as a part of overall design scheme. Further, the use of these devices is limited to the horizontal portions of a partial height partition, and thus the corner portions of a partial height partition will be left empty. This would result in an unbalanced look and feel in the office space. While corner planter boxes are known, as shown in U.S. Pat. No. 4,120,119, and have been used in porch areas and the like, such corner planter boxes could not be safely supported merely by the narrow width of the partial height partition. Without bracket means of some type, the corner planter boxes would be easily knocked off the partial height partition if the partition is jolted into or otherwise vibrated thus creating a dangerous situation on either side of the partial height partition.

Thus, it is apparent that the prior art lacks devices for securing planter boxes or other receptacles to the upper portion of a partial height partition wherein the partition becomes an integral portion of the overall design scheme or a planter which can be disposed on the corner portion of a partial height partition.

SUMMARY OF THE INVENTION

The present invention covers a planter box adapted for containing and displaying draping plants at the top portion of a partial height wall partition having substantially vertical decorative panels connected to a partition wall frame. The planter box includes a plant receptacle having a planting chamber defined by a bottom and a wall, wherein the bottom includes support means for the orientation and support of the plant receptacle on the upper horizontal surface of the partial height wall partition. The support means are concealedly secured between the decorative panels and the partition wall frame to which the decorative panels are connected, such securement being spacedly arranged from the peripheral edge of the bottom so that the planter box substantially covers the upper horizontal surface of the decorative panels. In further embodiments, the bottom and wall are shaped and sized to aesthetically accommodate the corner portions of a partial height wall partition, and the support means provided on the plant receptacle comprise two downwardly depending support flanges arranged in orthogonal relationship to one another for securement behind their corresponding orthogonally opposed decorative panels connected to the corner portion of the partial height wall partition. The front surface of the wall of the plant receptacle will be substantially contiguous and flush with the decorative surface of the decorative panels so as not to interrupt the continuity of the wall plane.

Accordingly, it is an object of the present invention to provide a planter box to be mounted at the top portion of a partial height wall partition having substantially vertical decorative panels connected to a partition wall frame wherein said planter box is particularly adapted for containing and displaying plants of the draping type so as to provide a more natural and aesthetically pleasing appearance of the plants displayed.

It is another object of the present invention to provide a planter box particularly adapted to be structurally and aesthetically nested on the top corner portion of a partial height wall partition so as to provide a hanging plant arrangement which is natural in appearance and incorporates the partition into the overall design scheme in an office space.

It is another object of the present invention to provide a planter box having support means for supporting and properly orienting the same on the top of a partial height wall partition, wherein said support means has no moving parts and is concealedly secured to the partial height wall partition by simple installation techniques.

These and other objects will become apparent, as will a better understanding of the concepts underlying the present invention, by reference to the description which follows when taken in conjunction with the accompanying drawings.

BRIEF DESCRIPTION OF THE DRAWINGS

FIG. 8 is a perspective view of the planter shown in FIG. 2 as installed on the corner portion of the partial height wall partition shown in FIG. 7.

DETAILED DESCRIPTION OF THE INVENTION

Figure 1:
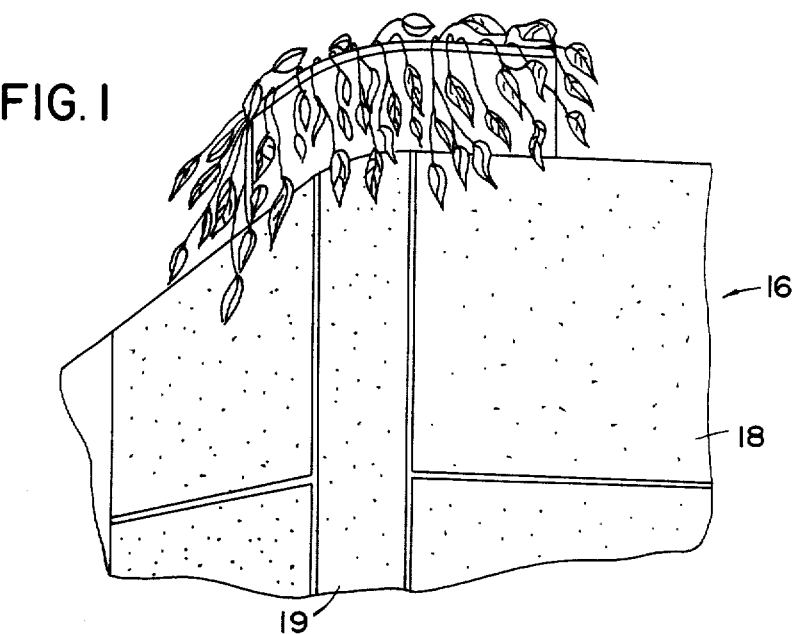
FIG. 1 is a front perspective view of the planter in accordance with the present invention, illustrating the same when installed, containing plants and in use on the corner portion of a partial height wall partition.

Referring to the drawings, FIGS. 2-5 illustrate the preferred embodiment of the planter generally designated as 10 in accordance with the present invention. The remaining figures illustrate the planter as installed on a partial height wall partition, FIG. 1 showing the planter with a draping plant therein.

The planter 10, preferably made of plastic, includes bottom means 11 having an inner surface 11a, an outer surface 11b and a peripheral edge 11c around the perimeter of bottom means 11. Connected to the peripheral edge 11c of the bottom means 11 is a first end 12a of wall means 12, the second end 12b of wall means 12 being spaced from first end 12a to define the height of the wall means 12. Together the bottom means 11 and the wall means 12 define a planting chamber for containing soil in which a plant can be planted, the second end 12b of the wall means 12 defining an opening for communication with said planting chamber. The second end 12b of wall means 12 can include shaped lip means for receiving the first end 12a of a second planter 10 thereby facilitating the stacking and storage of the planters 10 when packaged for delivery.

It is to be understood that the bottom means 11 and wall means 12 can be of any shape or size to accommodate different areas of a partial wall partition or to accommodate partial height partitions having particular structures. For instance, the bottom means 11 and wall means 12 can be shaped to provide a rectangular planter for orientation and display on the straight portions of a partial height partition, possibly at a position intermediate of two corner portions. The preferred embodiment depicted herein, however, shows a planter particularly adapted for disposition in the corner portion of a partial height partition, wherein wall means 12 includes a front wall 12c having a front surface 12d having a convex portion which joins two orthogonally opposed and generally planar surfaces, thereby providing a contoured surface identical to the contour of the corner portion of the partial height partition. Of course, should the angle defined by the partitions at the corner portion of the partial height partition be other than a 90 degrees, the bottom means 11 and wall means 12 of the planter 10 will be altered accordingly. The planter 10 also includes a rear section 12e and two side sections 12f and 12g connected, at an obtuse angle, to the rear section 12e and connected to the front wall 12c.

Figure 2:
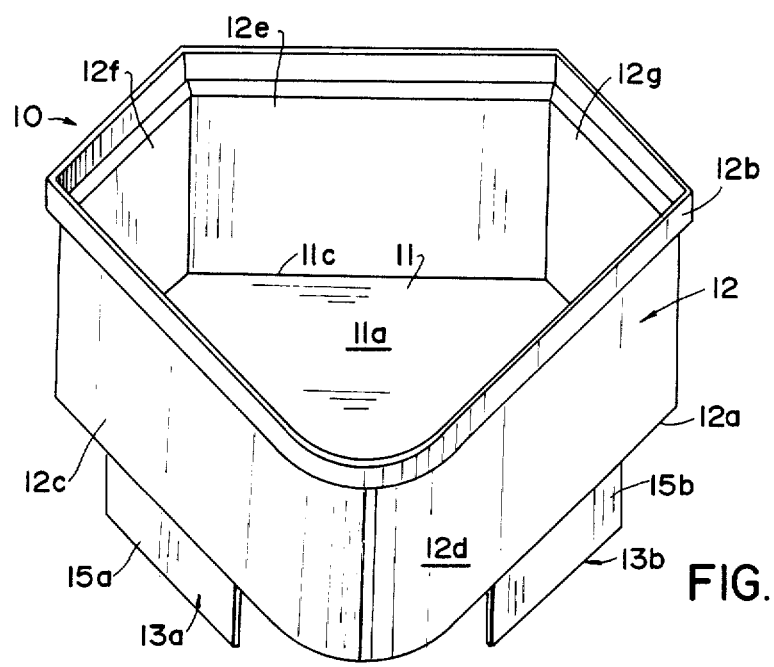
FIG. 2 is a front perspective view of a planter of the type shown in use in FIG. 1.
Figure 3:
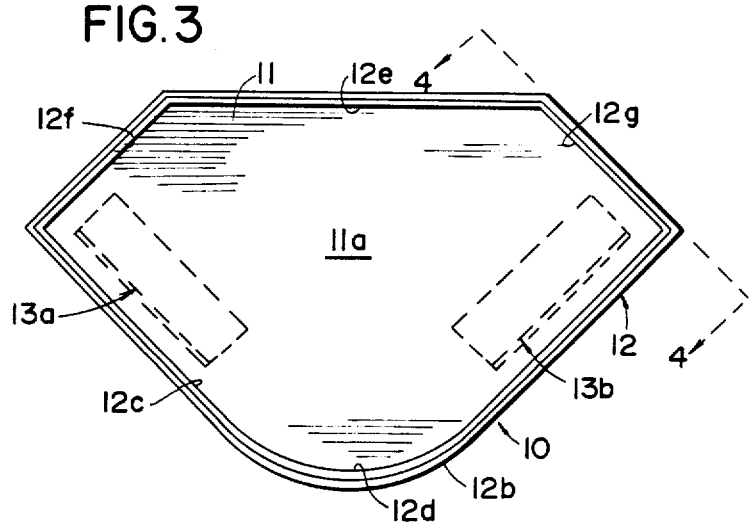
FIG. 3 is a top plan view of the planter shown in FIG. 2.
Figure 5:
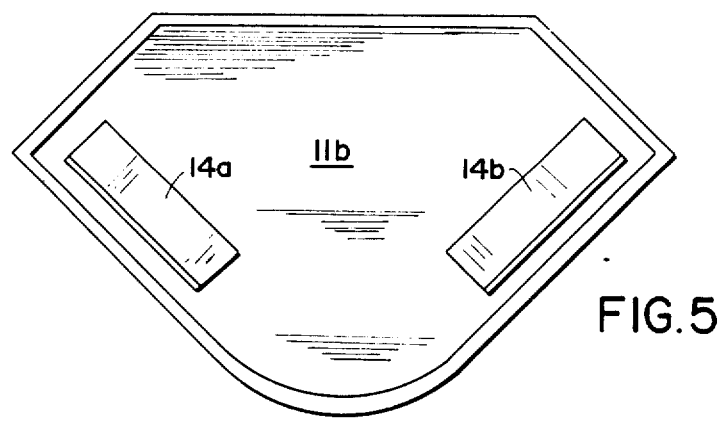
FIG. 5 is a bottom plan view of the planter shown in FIG. 2.
Figure 7:
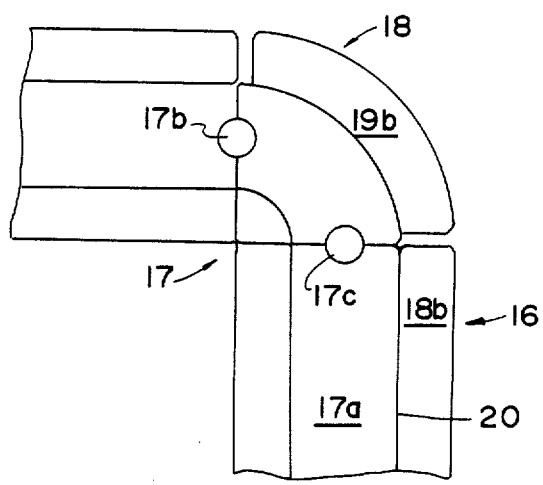
FIG. 7 is a top plan view of the portion of a partial height wall partition.
Figure 6:
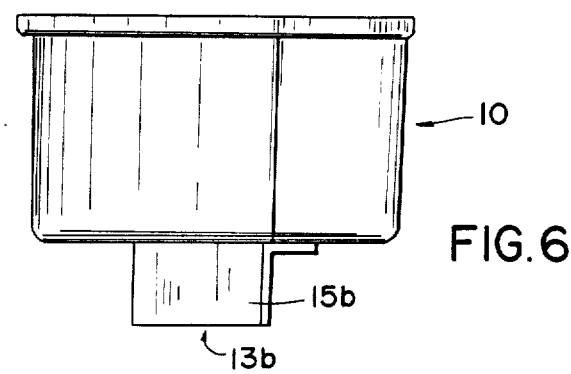
FIG. 6 is a right side elevational view of the planter shown in FIG. 2.

Fixed to the outer surface 11a of bottom means 11 are two support means 13a and 13b comprising horizontal sections 14a and 14b which are fixedly secured to the outer surface 11b of bottom means 11, as shown in FIG. 5, and downwardly depending support flanges 15a and 15b, which are clearly shown in FIGS. 2 and 6. The inside surface of downwardly depending support flanges 15a and 15b preferably include means for fastening the same to the partition wall frame of the partial height wall partition (not shown). Such means could include a suitable adhesive or any type of mechanical fastening means such as Velcro.

It is to be particularly noted that the support means 13 must be fixed to the outer surface 11b of the bottom means 11 so that the downwardly depending support flanges 15 secure as well as properly orient the planter 10 in relation to the partial height partition. In the preferred embodiment, the planter , being particularly adapted for the corner portion of a partial height partition, includes support means 13a and 13b having downwardly depending support flanges 15a and 15b disposed in orthogonal relationship to one another, each downwardly depending support flange being generally parallel to its corresponding planar surface of the front wall 12c of wall means 12. To further facilitate the proper Orientation of the planter 10, the downwardly depending support flanges 15 are spaced a predetermined distance from the peripheral edge 11c of bottom means 11 and the first end 12a of wall means 12, as is clearly shown in FIGS. 3 and 4. Providing this predetermined distance ensures that the front surface 12d of wall means 12 will be substantially contiguous and flush with the decorative panels behind which the downwardly depending support flanges 15 are secured. Thus, the foregoing features facilitate the proper orientation of the planter 10 in accordance with the preferred embodiment of the present invention. Such orientation provides the aesthetic and natural appearance of a plant or other decoration contained or displayed in the planter 10 and incorporates the partial height partition as an integral part of the decorative scheme employed in the office space.

FIGS. 1 and 7-9 illustrate a partial height wall partition, generally designated as 16, of the type contemplated for use in connection with the present invention. It is to be noted that partial height wall partitions as referred to herein include storage and filing cabinets and the like which also serve to partition office space and have decorative panels thereon, though they do not have relatively narrow upper horizontal surfaces as do the wall partitions depicted in the drawings. Thus, as shown in the figures, partial height wall partition 16 includes a partition wall frame 17 which provides structural support for the partial height wall partition 16 and includes an upper horizontal surface 17a. The frame 17 can be made of any suitable structure to provide the support required so long as it is relatively narrow in width. Vertically connected, as at 20, to the vertical side surfaces of the frame 17 are generally planar decorative panels 18 arranged in orthogonal relationship to one another, and convex shaped decorative panels 19 for the corner of the partial height wall partition 16. The generally planar decorative panels 18 are disposed in orthogonal relationship on either side of the convex shaped decorative panels 19. The generally planar decorative panels 18 and the convex shaped decorative panels 19 also include decorative surfaces 18a and 19a, respectively, as well as upper horizontal surfaces 18b and 19b. The various sections of frame 17 are fastened to one another by any suitable fastening means as indicated at 17b and 17c in FIG. 7. Decorative panels 18 and 19 are connected to the frame 17 in any suitable manner including Velcro fastening means or snap-fit fastening means.

Thus, to install the planter 10 on the upper horizontal surfaces 17a, 18b and 19b of the partial height partition 16, the planter 10 would be placed thereon so that the convex portion of front surface 12d of wall means 12 is aligned with the outer surface of the convex shaped decorative panel 19 and the downwardly depending support flanges 15 are vertically disposed against the corresponding orthogonally opposed sides of the frame 17 as at 20. As mentioned above, the inner surface of the downwardly depending support flanges 15 may include suitable fastening means to secure the same against frame 17. Once the planter 10 is in position, the upper orthogonally opposed decorative panels 18 immediately adjacent to the convex shaped decorative panels 19 can be snapped or otherwise fastened in position against frame 17.

Once the planter 10 is installed as described above, it is secure on the top of the partial height wall partition 16 such that it will not fall therefrom if the partial height wall partition 16 is vibrated by an individual jolting into the same or moving office equipment or furniture thereagainst. The downwardly depending support flanges 15 ensure that the planter 10 cannot be knocked or removed from the partial height wall partition 16 unless the decorative panels 18 are demounted from the frame 17.

Figure 4:
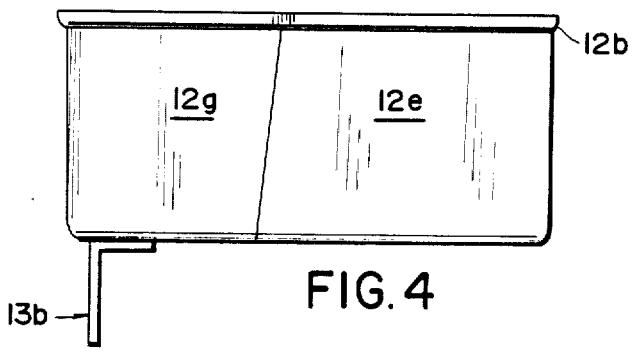
FIG. 4 is a rearward elevational view taken along lines 4—4 in FIG. 3.
Figure 9:
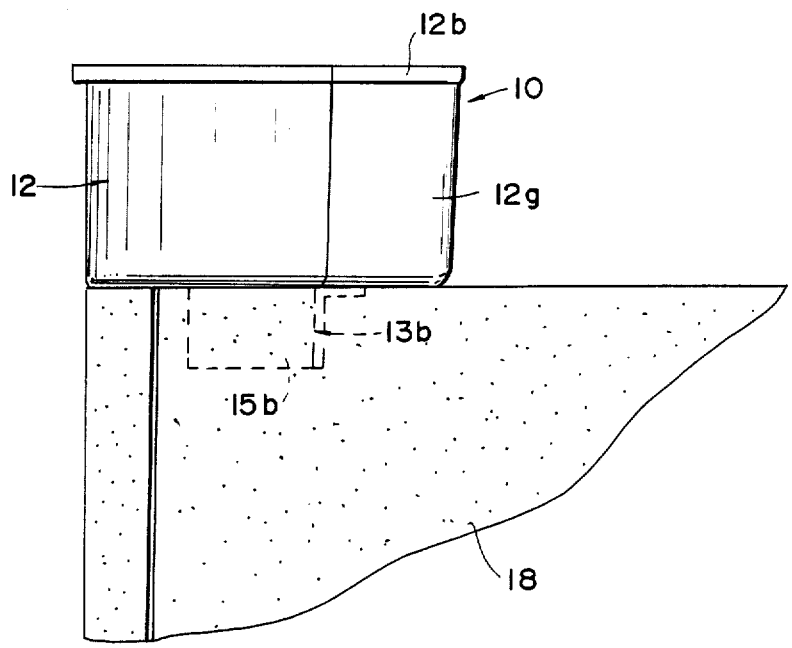
FIG. 9 is a right side view of the planter and corner portion of the partial height partition wall shown in FIG. 8.

As FIGS. 1, 8 and 9 illustrate, the front surface 12d of wall means 12 of the planter 10 are substantially contiguous and flush with the decorative surfaces 18a and 19a, as the upper horizontal surfaces 18b and 19b are covered by the outer surface 11b of bottom means 11. Such orientation of the planter 10 enhances the continuity of the decorative scheme as it incorporates the partition 16 as an integral part thereof. As discussed above, the placement of the downwardly depending support flanges 15 facilitates this aesthetically pleasing appearance and orientation of the planter 10. Of course, the distance between the peripheral edge 11c of bottom means 11 and the downwardly depending support flanges 15, as shown in FIG. 4, can be varied to accommodate decorative panels of different widths. To further enhance the integration of the partition 16 within the decorative scheme, the planter 10 can include a color which matches or complements the color of the decorative panels.

Thus, a planter box for containing and displaying draping plants or other decorative items, such as a fish tank, at the top portion of a partial wall partition to provide an aesthetically pleasing appearance in an office area has been described.

While the foregoing description and figures illustrate one preferred embodiment of the planter box in accordance with the present invention, it should be appreciated that certain modifications may be made in the structure and operation of the disclosed embodiment without departing from the spirit and scope of the present invention as defined by the claims which are set forth immediately below.

What is claimed is:

1. A planter to be disposed at the top of a partial height wall partition having a partition wall frame, decorative panels connected to the partition wall frame in a substantially vertical position and an upper horizontal surface on the decorative panel and partition wall frame, said planter comprising, a bottom defining a bottom surface, a peripheral sidewall cooperating with said bottom to provide a plant receptacle, and support means adapted to orient and support said planter on the upper horizontal surface of a partial height wall partition, said support means being constructed and arranged to be concealedly secured between the decorative panels and the partition wall frame of a partial height wall partition, said support means being spaced from said peripheral sidewall, so that said bottom surface of said planter substantially covers the upper horizontal surface of the decorative panel when said planter is disposed on a partial height wall partition and said support means having two downwardly depending support flanges in orthogonal relationship to one another for securement between corresponding orthogonally opposed decorative panels and the partition.

2. The planter claimed in claim 1, wherein said support means comprises at least one downwardly depending support flange connected to said bottom.

3. The planter claimed in claim 2, wherein said at least one downwardly depending support flange is spaced a predetermined distance from the peripheral edge of said bottom so that the front surface of said peripheral side wall is substantially flush with the outer surface of the decorative panels when the planter is in assembled position on the partial height wall partition.

4. The planter claimed in claim 3, wherein said bottom and said peripheral wall include a corner portion which is shaped and sized to accommodate a corner portion of the partial height wall partition, said peripheral wall having two orthogonally opposed sections connected by a connecting section, said orthogonally opposed sections and said connecting section being substantially flush with the decorative panels of the partial height wall partition when said planter is disposed on the partial height wall partition.

5. In combination, a partial height wall partition and a planter to be disposed at the top thereof, said partial height wall partition including a partition wall frame and decorative panels connected to said partition wall frame in a substantially vertical position, said partition wall frame and said decorative panels having an upper horizontal surface, and said planter comprising, a bottom defining a bottom surface and a peripheral side wall cooperating therewith to provide a plant receptable, support means for orienting and supporting said plant receptacle on the upper horizontal surface of the partial height wall partition, said support means being concealedly secured between the decorative panels and the partition wall frame, and said support means having two downwardly depending support flanges in orthogonal relationship to one another for securement between corresponding orthogonally opposed decorative panels and the partition wall frame.

6. The combination claimed in claim 5, wherein said support means is spaced from said peripheral side wall of said bottom means so that said bottom surface of said planter substantially covers the upper horizontal surface of the decorative panels.

7. The combination claimed in claim 6, wherein said support means comprises at least one downwardly depending support flange connected to said bottom.

8. The combination claimed in claim 7, wherein said at least one downwardly depending support flange is spaced a predetermined distance from said peripheral side wall so that the front surface of said peripheral side wall means is substantially flush with the decorative surface of the decorative panels when the planter is in assembled position on the partial height wall partition.

9. The planter claimed in claim 8, wherein said bottom and said peripheral wall include a corner portion which is shaped and sized to accommodate a corner portion of the partial height wall partition, said peripheral wall having two orthogonally opposed sections connected by a connecting section, said orthogonally opposed sections and said connecting section being substantially flush with the decorative panels of the partial height wall partition when said planter is disposed on the partial height wall partition.

* * * * *

UNITED STATES PATENT AND TRADEMARK OFFICE
CERTIFICATE OF CORRECTION

PATENT NO. : 4,912,876

DATED : April 3, 1990

INVENTOR(S) : Alyce Ginsberg

It is certified that error appears in the above-identified patent and that said Letters Patent is hereby corrected as shown below:

Column 6, line 51, after "partition" insert --wall frame--.

Signed and Sealed this

Thirtieth Day of July, 1991

Attest:

HARRY F. MANBECK, JR.

*Attesting Officer*  *Commissioner of Patents and Trademarks*